May 10, 1932.   R. LEE   1,857,202
ELECTRIC MOTOR
Filed June 29, 1929
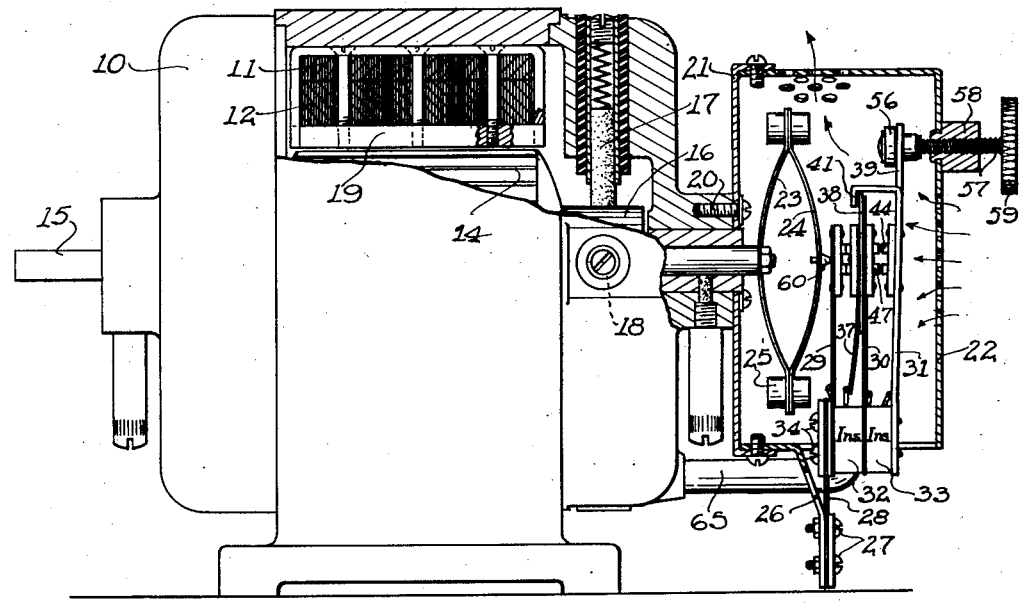
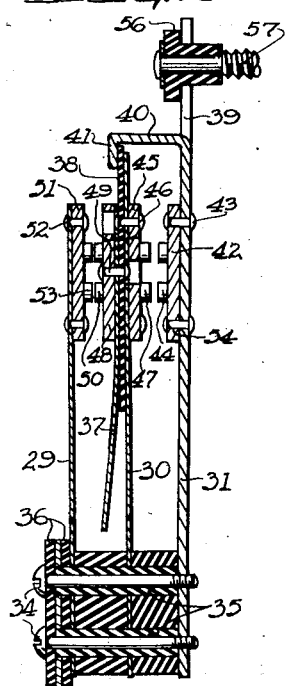
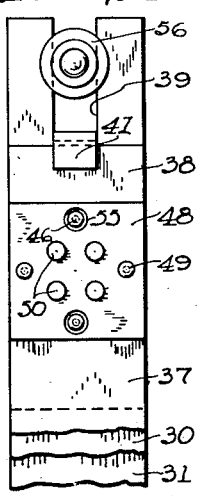
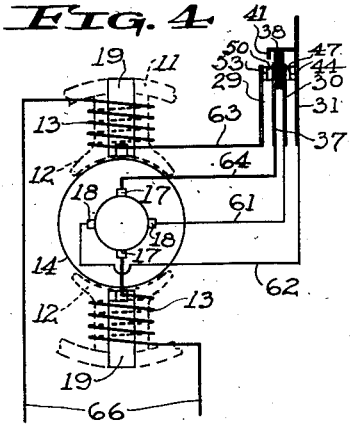

Patented May 10, 1932

1,857,202

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

ELECTRIC MOTOR

Application filed June 29, 1929. Serial No. 374,646.

The invention relates to electric motors and governors therefor.

An object of the invention is to provide an alternating current motor including a secondary circuit having an intermittently-operated circuit-closer therein for controlling the speed of the motor.

Another object of the invention is to provide a commutator type motor in which the secondary circuit includes a winding on the rotor for obtaining a repulsion characteristic and in which circuit is placed a periodically-operated circuit-breaker for controlling the motor speed.

A further object of the invention is to provide an electric motor of this type in which the speed is further controlled under light load conditions by an auxiliary circuit-breaker in the main load circuit.

A further object is to relate the circuit-breakers in the secondary circuit and main load circuit in such manner as to automatically cause the circuit-breaker in the main load circuit to become effective only under light load conditions and to remain closed under heavier load conditions, under which latter load conditions the circuit-breaker in the secondary circuit becomes effective.

A further object is to provide a circuit-breaker mechanism for this purpose including a plurality of centrifugally-influenced circuit-breakers arranged in tandem relation.

A further object is to provide a centrifugally-operated switch mechanism which is of simple but durable construction, inexpensive to manufacture and capable of carrying relatively heavy currents.

A further object is to provide a centrifugally-operated switch mechanism which includes non-rotatable contacts displaceable by a centrifugally-influenced member movable axially of the motor shaft beyond the end of the shaft.

A further object is to perfect details of construction generally.

The invention further consists in the several features hereinafter set forth and more particularly defined by the annexed claims.

In the accompanying drawings, Fig. 1 is a side elevation of an electric motor constructed in accordance with the invention, parts being broken away and parts being shown in section;

Fig. 2 is a detail sectional elevation of the circuit-closer device;

Fig. 3 is a fragmentary detail elevation of part of the circuit-closer device, and Fig. 4 is a schematic wiring diagram of a motor and its controlling circuits.

In these drawings, the numeral 10 designates an electric motor here indicated to be of a series commutator type adapted for operation on alternating current. The motor is provided with a stationary field structure 11 including one or more pairs of pole pieces 12 having field windings 13 carried thereon. An armature 14 is rotatable within the pole pieces and is carried on a shaft 15 on which is mounted a commutator 16. Pairs of brushes 17 and 18 bear on the commutator 16, the brushes 17 being in the main load circuit while the brushes 18 are in a secondary circuit, as hereinafter described.

The pole pieces 12 carry thereabout closed metallic loops 19, preferably of low resistance metal such as copper, each loop being arranged centrally of its pole piece to lie in a radial plane parallel with the normal field flux. The closed metallic loops 19 serve as effective compensating means to insure satisfactory operation of the motor on alternating current and on interrupted current.

One of the motor hubs has secured thereto by screws 20 a circumferentially flanged disk 21 having mounted thereon a cup-shaped casing 22, which is perforated about its periphery and at its end. The shaft 15 has secured thereon at one end one of a pair of bowed leaf springs 23 and 24, which are spaced along the axis of the shaft and extend outwardly therefrom in a radial plane. The outer ends of the leaf springs are connected together and carry weights 25 thereon, which are urged outwardly under the influence of centrifugal force to displace the leaf spring 24 toward the leaf spring 23.

A tongue 26 is bent downwardly from the lower portion of the cup-shaped casing 22 and has mounted thereon by screws 27 an upstanding leaf spring 28 projecting into the space within the casing. The upper end of the leaf spring 28 has secured thereto a circuit-closer assembly which includes a pair of spaced leaf springs 29 and 30 and a sheet metal arm 31 which latter is spaced from the leaf spring 30. The leaf springs 28, 29, 30 and the arm 31 are arranged in a substantially vertical position to lie in a plane extending radially through the armature shaft 15, the leaf spring 29 being adjacent the governor leaf spring 24 and the arm 31 being distant therefrom, while the leaf spring 30 is disposed between the leaf spring 29 and the arm 31. The leaf springs 29 and 30 are spaced at their lower ends by an insulating block 32, and the leaf spring 30 and arm 31 are spaced at their lower ends by a similar insulating block 33. The leaf springs 29 and 30 and arm 31 are fixedly secured to the upper end of the leaf spring 28 by means of screws 34 which are tapped into the arm 31 and pass through the leaf springs 29 and 30. Insulating bushings 35 surround the screws 34 to insulate the arm 31 from the leaf springs 28, 29 and 30, and insulating plates 36 are placed on either side of the leaf springs 28 to insulate this leaf spring from the leaf spring 29 and the screws 34. The upper end of the leaf spring 30 extends above the leaf spring 29 and is insulated from a contact strip 37 by means of an insulating strip 38, which also extends above the leaf spring 29. The upper end of the arm 31 is forked to present a slot 39 therein, and a tongue 40 extending from the arm is provided with a down-turned end 41 which forms a stop engageable with the upper end of the insulating strip 38 to limit the movement of the leaf spring 30 away from the arm.

A radiator plate 42, preferably formed of metal of high thermal conductivity, such as copper, is secured by suitable fastening means, such as rivets 43, to the arm 31 and carries thereon a plurality of spaced contacts 44. Another radiator plate 45 is secured by rivets 46 to the adjacent face of the leaf spring 30 and carries a plurality of contacts 47 which co-operate with the contacts 44. A third radiator plate 48 is secured by rivets 49 to the contact strip 47 and carries contacts 50, the rivets 46 and 49 also serving to secure in place the contact strip 37 and insulating strip 38. A fourth radiator plate 51 is secured by rivets 52 to the adjacent face of the leaf spring 29 and carries a plurality of contacts 53 which co-operate with the contacts 50. The radiator plates 42, 45, 48 and 51 are preferably of identical construction to facilitate manufacture, and, in the present instance, each plate carries at its central portion four spaced contacts which are symmetrically arranged. Each radiator plate is provided with two oppositely-disposed openings 54 which receive the attaching rivets and two other larger openings 55 which, in the case of the plates 45 and 48, provide clearance for the headed portions of the rivets 46 and 49 to facilitate the mounting of these plates in insulated relation. The contacts 44, 47, 50, and 53 are preferably formed of tungsten.

The slot 39 at the upper end of the arm 31 receives therein a flanged insulating sleeve 56 which is secured to the inner end of an adjusting screw 57 threaded in a bushing 58 fixedly secured to the casing 22. The outer end of the adjusting screw 57 is provided with a thumb wheel 59 by means of which the screw can be moved in or out to adjust the normal position of the spring-mounted arm 31. A conical insulating button 60 is secured to the bowed leaf spring 24 to lie along the axis of the armature shaft beyond the end of the shaft and forms an actuator bearing on the leaf spring 29 to determine the position of this leaf spring in accordance with the speed of the motor. The button 60 is formed of fibre or other suitable material.

The spring assembly carrying the circuit-closer contacts can be modified in a number of ways. For example, the spring 28 might be secured anywhere along the lower ends of the springs 29, 30, the arm 31, or the insulating blocks 32 and 33, or in other cases the spring 28 might be made integral with either of the springs 29 or 30, or with the arm 31. In any case, it is desirable, though not entirely necessary, to insulate the spring assembly from the casing 22.

The leaf spring 30 and arm 31 are respectively connected by conductors 61 and 62 with the brushes 18 to form part of the secondary circuit, and the leaf spring 29 and contact strip 37 are respectively connected by conductors 63 and 64, one of which is connected to one end of one of the field windings 13, the other of which is connected to one of the brushes 17, the other brush 17 being connected to one end of the other field winding 13. The conductors 61, 62, 63 and 64 may be enclosed in a suitable conduit 65 extending between the motor housing and the governor casing 22. The other ends of the field windings 13 are connected to alternating current mains 66.

In the operation of the motor under medium and heavy loads, the contacts 50 and 53 in the main load circuit remain closed while the contacts 44 and 47 in the secondary circuit are periodically separated by the slight axial displacement of the actuator 60 carried on the governor leaf spring 24, this displacement of the actuator being communicated through the contacts 50 and 53 which remain in engagement. The opening of the secondary circuit increases the impedance of the motor circuit to reduce the motor speed, while the closing of the secondary circuit decreases the impedance of the motor circuit to cause an increase in the motor speed.

During the intervals in which the secondary circuit is closed, a repulsion characteristic is obtained by which the torque of the motor is substantially increased. During the operation of the motor, the compensating loops 19 serve to insure good commutation and to secure a high power factor. To lower the speed of the motor, the screw 57 is turned outwardly to outwardly displace the arm 31 against the action of the leaf spring 28, under which condition the contacts 44 and 47 in the secondary circuit will separate at a lower speed. Conversely, to obtain a high operating speed, the screw 57 is turned inwardly in order that the contacts 44 and 47 will separate at a higher speed.

Under conditions of light load and especially at low speeds, the periodic interruption of the main load circuit is used in obtaining speed regulation. Under these conditions the regulating screw 57 is turned out sufficiently far so that the contacts 44 and 47 in the secondary circuit will remain open, to thereby maintain a high impedance in the motor circuit, while the contacts 50 and 53 in the main load circuit are periodically engaged and separated under the action of the governor. In this adjustment of the contact assembly, the upper end of the insulating strip 38 carried by the leaf spring 30 is engageable with the stop 41 in order that the contacts 53 may periodically separate from the contacts 50. To stop the motor, the adjusting screw 57 may be turned out sufficiently far to place the contacts 50 and 53 out of engagement, the leaf spring 29 being suitably tensioned to permit this disposition of the contacts.

During the operation of the motor, the governor weights 25 exert a fanning action serving to draw air into the end of the casing and to expel it through the apertured periphery of the casing, as indicated by arrows in Fig. 1, thereby serving to cool the contacts. The copper radiators on which the contacts are mounted also serve to effectively dissipate heat generated at the contacts, so that the contacts will remain relatively cool, thereby substantially increasing their useful life. The provision of multiple contacts also greatly increases the operating life of the contacts.

By placing the governor contacts in a secondary circuit, these contacts need carry only a relatively small fraction of the load current, thus permitting the use of a much larger motor than would be possible if the contacts were placed directly in the load circuit and also increasing the life of the contacts. Under conditions of light load, the governor contacts in the main load circuit can easily handle the relatively small current then flowing. In cases where comparatively large load and speed range is not necessary, the governor contacts in the main load circuit can be omitted. If desired, it is possible to place any well known spark dissipating device across the contacts, such as a condenser or a resistance, but in general this is unnecessary.

While the motor is more particularly intended for operation on alternating current, it is also possible to operate the motor on direct current, in which event the contacts 50 and 53 in the main load circuit will serve to control the speed of the motor. When the motor is operated on direct current or on alternating current of low frequency, such as 25 cycle current, the intermittent opening of the secondary brush circuit is of no particular advantage, and under these conditions it is desirable to keep this secondary circuit closed.

What I claim as new and desire to secure by Letters Patent is:

1. The combination of an alternating current motor having a secondary circuit and a main circuit, and means for controlling the speed of the motor including a periodically-operating circuit-closer connected in said secondary circuit, a second circuit-closer connected in said main circuit, and means for rendering said last-named circuit-closer effective only under conditions of relatively light load.

2. The combination of an alternating current motor having a secondary circuit and a main circuit, a periodically-operating circuit-closer connected in said secondary circuit, a second circuit-closer disposed in said main circuit, said circuit-closers being arranged in tandem relation, and motor-speed-influenced means acting on one of said circuit-closers and through said circuit-closer acting on the other of said circuit-closers.

3. The combination of an alternating current motor having a secondary circuit and a main circuit and including a rotor having a shaft, a motor-speed-influenced governor carried on said shaft and including an axially-movable actuator, and a circuit-closer device comprising a resiliently-mounted arm and a pair of resilient members spaced therefrom and from each other for movement all in the same plane, one of said resilient members being operatively connected with said actuator, contacts carried on said resilient members and said arm to form a pair of circuit-closers, one of which circuit-closers is placed in said secondary circuit and the other of which circuit-closers is placed in said main load circuit, the contacts in said main load circuit being disposed nearer to said actuator, a stop carried on said arm for limiting the movement of the intermediately disposed resilient member away from said arm, and means for adjusting the position of said resiliently-mounted arm with respect to said actuator for varying the motor speed at which said circuit-closers will operate.

4. The combination of an alternating current motor having a secondary circuit and including a rotor having a shaft, a motor-speed-influenced governor carried on said shaft and including an axially movable actuator, a circuit-closer device comprising a resiliently-mounted arm and a resilient member spaced therefrom for movement in the same plane, said resilient member being operatively connected with said actuator, contacts carried on said resilient member and said arm to form a circuit-closer which is disposed in said secondary circuit, and means for adjusting the position of said resiliently mounted arm with respect to said actuator for varying the motor speed at which said circuit-closer will operate.

5. The combination of an electric motor including a rotor having a shaft, a motor-speed-influenced governor carried on said shaft and including an axially movable actuator, a circuit-closer device comprising a resiliently-mounted arm and a resilient member spaced therefrom for movement in the same plane, contacts carried by said resiliently-mounted arm and resilient member to form a circuit-closer connected in circuit with the motor, and means for adjusting the position of said resiliently-mounted arm with respect to said actuator for varying the motor speed at which said circuit-closer will operate.

6. The combination of an electric motor including a rotor having a shaft, a motor-speed-influenced governor carried on said shaft and including an axially-movable actuator beyond the end of said shaft, a pair of contact-carrying members one of which is resiliently mounted and operatively connected with said actuator, said contact-carrying members forming a circuit-closer connected in circuit with said motor, and means for adjusting the position of said other contact-carrying member for determining the motor speed at which said contacts will separate.

7. The combination of an electric motor having a field structure and a rotor, inductive compensating means mounted on said field structure, a secondary circuit including said rotor, and an intermittently operating speed-controlling circuit-closer connected in circuit with said motor.

In testimony whereof, I affix my signature.

ROYAL LEE.